United States Patent
Baroux (10) Patent No.: US 10,569,502 B2
(45) Date of Patent: Feb. 25, 2020

(54) FIRE RESISTANT ARTICLE, AND ASSOCIATED PRODUCTION METHOD

(71) Applicant: BLH TECHNOLOGIES INC., Halifax (CA)

(72) Inventor: Daniel Baroux, Halifax (CA)

(73) Assignee: BLH Technologies Inc., Halifax, Nova Scotia (CA)

( * ) Notice: Subject to any disclaimer, the term of this patent is extended or adjusted under 35 U.S.C. 154(b) by 448 days.

(21) Appl. No.: 15/141,985

(22) Filed: Apr. 29, 2016

(65) Prior Publication Data

US 2016/0243789 A1 Aug. 25, 2016

Related U.S. Application Data

(63) Continuation of application No. PCT/CA2014/051044, filed on Oct. 30, 2014.

(Continued)

(51) Int. Cl.
*B32B 5/26* (2006.01)
*B32B 37/16* (2006.01)
(Continued)

(52) U.S. Cl.
CPC .............. *B32B 5/26* (2013.01); *B27N 3/04* (2013.01); *B27N 9/00* (2013.01); *B32B 5/08* (2013.01); *B32B 7/12* (2013.01); *B32B 21/02* (2013.01); *B32B 21/042* (2013.01); *B32B 21/10* (2013.01); *B32B 21/14* (2013.01); *B32B 27/42* (2013.01); *B32B 29/002* (2013.01); *B32B 29/02* (2013.01); *B32B 37/16* (2013.01); *B32B 37/182* (2013.01);
(Continued)

(58) Field of Classification Search
CPC .................................. B32B 5/26; B32B 37/16
See application file for complete search history.

(56) References Cited

U.S. PATENT DOCUMENTS 5,443,894 A * 8/1995 Pollock .................... B32B 7/02
428/213
6,740,381 B2 5/2004 Day et al.
(Continued)

FOREIGN PATENT DOCUMENTS

CN 2379296 5/2000

*Primary Examiner* — Andrew T Piziali
(74) *Attorney, Agent, or Firm* — Womble Bond Dickinson (US) LLP (57) ABSTRACT

A method of forming an article and associated article are provided. Multi-fiber cellulose strips are interacted with a bonding agent and layered in a plurality of layers, the layered cellulose strips collectively defining opposed major surfaces. A porous sheet member, interacted with a fire-retarding solution, is engaged with at least one of the major surfaces of the layered cellulose strips, such that the porous sheet member substantially covers the at least one major surface. The layered cellulose strips and the porous sheet member are collectively exposed to an actuating element, configured to actuate the bonding agent to facilitate cohesion of the layered cellulose strips and the porous sheet member, to form a board member, wherein the at least one major surface cooperates with the porous sheet member engaged therewith, in response to the actuating element, such that the porous sheet member forms a substantially smooth and uniform surface.

20 Claims, 7 Drawing Sheets

Related U.S. Application Data (60) Provisional application No. 61/898,200, filed on Oct. 31, 2013.

(51) Int. Cl.

| | | |
|---|---|---|
| *B27N 3/04* | (2006.01) | |
| *B27N 9/00* | (2006.01) | |
| *B32B 21/02* | (2006.01) | |
| *B32B 37/18* | (2006.01) | |
| *B32B 5/08* | (2006.01) | |
| *B32B 21/10* | (2006.01) | |
| *B32B 21/14* | (2006.01) | |
| *B32B 27/42* | (2006.01) | |
| *B32B 29/00* | (2006.01) | |
| *B32B 29/02* | (2006.01) | |
| *B32B 7/12* | (2006.01) | |
| *B32B 21/04* | (2006.01) | |
| *B27N 7/00* | (2006.01) | |
| *B27N 3/00* | (2006.01) | |
| *B32B 38/00* | (2006.01) | |

(52) U.S. Cl.
CPC ............... *B27N 3/002* (2013.01); *B27N 7/00* (2013.01); *B32B 2038/0084* (2013.01); *B32B 2260/021* (2013.01); *B32B 2260/026* (2013.01); *B32B 2260/028* (2013.01); *B32B 2262/062* (2013.01); *B32B 2262/101* (2013.01); *B32B 2307/3065* (2013.01); *B32B 2307/7145* (2013.01); *B32B 2307/73* (2013.01); *B32B 2307/764* (2013.01); *B32B 2317/18* (2013.01); *B32B 2607/00* (2013.01)

(56) References Cited

U.S. PATENT DOCUMENTS

| | | |
|---|---|---|
| 7,393,577 B2 | 7/2008 | Day et al. |
| 8,419,883 B2 | 4/2013 | Day et al. |
| 2007/0207690 A1 | 9/2007 | Huddy et al. |
| 2008/0251182 A1 | 10/2008 | Thomas et al. |
| 2012/0251817 A1 | 10/2012 | Wiehn et al. |
| 2012/0312453 A1 | 12/2012 | Baroux |
| 2013/0292077 A1 | 11/2013 | Baroux |
| 2016/0031132 A1 | 2/2016 | Baroux |

\* cited by examiner

FIRE RESISTANT ARTICLE, AND ASSOCIATED PRODUCTION METHOD

CROSS REFERENCE TO RELATED APPLICATIONS

This application is a continuation of International Application No. PCT/US2014/051044, filed Oct. 30, 2014, which International application was published by the International Bureau in English on May 7, 2015, which claims priority to U.S. Provisional Application No. 61/898,200, filed on Oct. 31, 2013, which all are incorporated by reference herein in their entirety.

BACKGROUND OF THE DISCLOSURE

Field of the Disclosure

Aspects of the present disclosure relate to methods for forming fire resistant articles and articles made by such methods, and, more particularly, to a method for forming a fire resistant article, such as an oriented strand board, and associated article made by such method.

Description of Related Art

It may sometimes be desirable for particular articles or products to exhibit resistance to heat and/or fire. In this regard, one significant impediment to implementing cellulose products on a widespread basis is the risk of fire. That is, though cellulose products may be implemented in many different applications, those applications may be precluded by the apparent lack of fire resistance provided by such cellulose products. In some instances, a paperboard product may have a fire-retardant product applied thereto, post-formation, to provide some fire resistance capabilities for the paperboard product. That is, an exemplary as-formed paperboard product may have a surface treatment, for example, a liquid fire retardant, applied thereto (i.e., sprayed on) in order for the treated product to exhibit at least some fire resistance. In such cases, however, one possible limitation in the treatment of the as-formed paperboard product for fire resistance, particularly with a liquid fire retardant, is achieving an even and consistent treatment of that product. More particularly, the result of some fire resistance treatment processes involving application of a liquid fire-retardant to an as-formed paperboard product may be an uneven or otherwise inconsistent coverage of the fire retardant with respect to the product. In those instances, the uneven treatment may result in varying levels of fire resistance of the treated paperboard product which may, in turn, become a hazard in the event of a fire, which the product is intended to retard or otherwise provide some resistance against. Further, such treatment processes may not necessarily be efficient in terms of applying the fire retardant to the paperboard product.

In addition, even with as-formed cellulose products treated with a liquid fire retardant, the treated product may not necessarily be heat resistant. That is, even if the as-formed cellulose product, treated with a liquid fire retardant, were to be locally fire resistant, the associated heat may break down the cellulose and allow the fire to penetrate the product.

In some instances, it may also be desirable for certain board products to define and include a substantially smooth and uniform major surface, for example, for receiving a surface veneer treatment or other aesthetic surface treatment, particularly where such a surface treatment is relatively thin (i.e., paper or stock, wallpaper, paint, etc.). In such instances, if that major surface is not substantially smooth and uniform, any imperfections in the surface of the board product will likely (and undesirably) print through the thin veneer or other thin aesthetic treatment applied to that surface. That is, any protrusions, depressions, or even wood grain texture, for example, evident on the treatment-receiving surface of the board product will likely and undesirably show, print, or telegraph through any thin veneer or thin surface treatment applied to that cellulose board product. In addition, there may exist the risk of non-uniform or otherwise poor adhesion of the veneer to the treatment-receiving surface. While the lack of a substantially smooth and uniform surface may be compensated for, for example, by smoothing the surface, selecting a more viscous adhesive, or increasing the thickness/rigidity of the veneer, such measures may be more costly, the process may be more difficult, and the risk will still exist for printing of non-uniformities and non-uniform adhesion of the veneer to the surface. One such example of a cellulose board product historically lacking such a smooth and uniform major surface is, for example, oriented strand board (OSB), while examples of cellulose board products generally having such a smooth and uniform surface includes, for example, medium density fiber (MDF) board or particle board. For such reasons, MDF and particle board may be preferred, for example, in the furniture industry, particularly in instances where a thin veneer is applied to the cellulose board product. However, MDF and particle board tend to be more expensive in terms of cost, compared to other cellulose board products such as OSB.

Thus, there exists a need for a process for evenly and consistently applying a fire retardant, particularly a liquid fire retardant, to a cellulose product such as, for example, a paperboard product and/or a cellulose board product. In some instances, it may also be desirable to form a cellulose product (i.e., OSB) having a substantially smooth and uniform major surface to facilitate veneer or other surface treatment application, while also providing an enhanced level of heat/fire resistance, and a lower cost compared to other cellulose products having a substantially smooth and uniform surface (i.e., MDF or particle board).

BRIEF SUMMARY OF THE DISCLOSURE

The above and other needs are met by aspects of the present disclosure, wherein one such aspect relates to a method of forming an article. Such a method comprises layering multi-fiber cellulose strips in a plurality of layers, with the cellulose strips being interacted with a bonding agent, and with the layered cellulose strips collectively defining opposed major surfaces. A porous sheet member, interacted with a fire-retarding solution, is engaged with at least one of the major surfaces of the layered cellulose strips, such that the porous sheet member substantially covers the at least one major surface. The layered cellulose strips and the porous sheet member are collectively exposed to an actuating element, the actuating element being configured to actuate the bonding agent so as to facilitate cohesion of the layered cellulose strips and the porous sheet member, to form a board member therefrom, with the at least one major surface cooperating with the porous sheet member engaged therewith, in response to the actuating element, such that the porous sheet member forms a substantially smooth and uniform surface.

Another aspect of the present disclosure relates to an article, comprising a plurality of layers of multi-fiber cellulose strips, wherein the layered cellulose strips collectively include opposed major surfaces, and a bonding agent interacted with the cellulose strips. A porous sheet member having a fire-retarding solution interacted therewith is engaged with at least one of the major surfaces of the layered cellulose strips so as to substantially cover the at least one major surface. The porous sheet member is configured to cooperate with at least one of the layered cellulose strips and the bonding agent, and the cellulose strips; with the porous sheet member, the layered cellulose strips, and the bonding agent collectively being responsive to an actuating element configured to facilitate cohesion of the layered cellulose strips and the porous sheet member; such that the at least one major surface having the porous sheet member engaged therewith defines a substantially smooth and uniform surface of a board member formed therefrom.

The bonding agent may comprise, but is not limited to, at least one of urea-formaldehyde (UF), melamine-modified urea-formaldehyde resin (MUF), a phenolic resin, a wax, and methylene diphenyl diisocyanate (MDI). The actuating element to which the layered cellulose strips and the porous sheet member are exposed may comprise at least one of pressure, heat, humidity, heated air, heated humid air, steam, microwave energy, and infrared energy. The porous sheet member may comprise one of a kraft paper, an encasement paper, a cellulose paper, a glass fiber sheet, a glass fiber scrim, a sheet comprising a combination of cellulose fibers and glass fibers, a veneer sheet, a porous sheet in which component fibers thereof treatable with the fire-retarding solution, a paper stock, a card stock, and combinations thereof.

The fire-retarding solution may comprise one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof. Generally, the fire-retarding solution may comprise one of an aqueous fire-retarding solution, a nontoxic liquid fire-retarding solution, and a neutral pH liquid fire-retarding solution. That is, in particular aspects, the fire-retarding solution may be an aqueous fire-retarding solution, or it may be preferred that the fire-retarding solution be nontoxic and/or have a neutral pH and/or be hypoallergenic and/or have any number of otherwise desirable properties. In some aspects, one of a mold inhibitor, a water resistance treatment, and an insect deterrent may be interacted with one of the porous sheet member, the fire-retarding solution, the cellulose strips, and the bonding agent prior to exposing the layered cellulose strips and the porous sheet member to the actuating element. The insect deterrent may comprise one of glass particles and a borate substance, for providing a termite deterrent.

The cellulose strips may be layered such that the cellulose strips defining each of the opposed major surfaces have the fibers thereof oriented along a strength axis of the board member. Further, at least a portion of the cellulose strips not defining either of the opposed major surfaces may have the fibers thereof oriented perpendicularly to the strength axis of the board member. In some instances, the layered cellulose strips and the porous sheet member may be deposited into a mold arrangement prior to exposing the layered cellulose strips and the porous sheet member to the actuating element. In other instances, the layered cellulose strips and the porous sheet member may be deposited in a thermal press and exposed to an actuating element comprising at least one of pressure, heat, humidity, heated air, heated humid air, steam, microwave energy, and infrared energy, to form the board member.

The layered cellulose strips and the porous sheet member, collectively, may be exposed to an actuating element configured to actuate a volumetrically-expansive reaction between the fire-retarding solution associated with the porous sheet member and the bonding agent associated with the layered cellulose strips. In particular instances, the porous sheet member is exposed to a substantially smooth and uniform surface adjacent thereto, in conjunction with the layered cellulose strips and the porous sheet member being exposed to the actuating element, such that the volumetrically-expansive reaction causes the porous sheet member to conform to the substantially smooth and uniform surface adjacent thereto.

The present disclosure thus includes, without limitation, the following embodiments:

Embodiment 1: A method of forming an article, the method comprising layering multi-fiber cellulose strips in a plurality of layers, the cellulose strips being interacted with a bonding agent, and the layered cellulose strips collectively defining opposed major surfaces; engaging a porous sheet member, the porous sheet member being interacted with a fire-retarding solution, with at least one of the major surfaces of the layered cellulose strips, such that the porous sheet member substantially covers the at least one major surface; and exposing the layered cellulose strips and the porous sheet member, collectively, to an actuating element, the actuating element being configured to actuate the bonding agent so as to facilitate cohesion of the layered cellulose strips and the porous sheet member, and to form a board member therefrom, the at least one major surface cooperating with the porous sheet member engaged therewith, in response to the actuating element, such that the porous sheet member forms a substantially smooth and uniform surface.

Embodiment 2: The method of any preceding or subsequent embodiment, or combinations thereof, further comprising engaging a bonding agent with the cellulose strips, the bonding agent comprising at least one of urea-formaldehyde (UF), melamine-modified urea-formaldehyde resin (MUF), a phenolic resin, a wax, and methylene diphenyl diisocyanate (MDI).

Embodiment 3: The method of any preceding or subsequent embodiment, or combinations thereof, wherein exposing the layered cellulose strips and the porous sheet member to an actuating element further comprises exposing the layered cellulose strips and the porous sheet member, collectively, to an actuating element configured to actuate a volumetrically-expansive reaction between the fire-retarding solution associated with the porous sheet member and the bonding agent associated with the layered cellulose strips.

Embodiment 4: The method of any preceding or subsequent embodiment, or combinations thereof, further comprising exposing the porous sheet member to a substantially smooth and uniform surface adjacent thereto, in conjunction with exposing the layered cellulose strips and the porous sheet member to the actuating element, such that the volumetrically-expansive reaction causes the porous sheet member to conform to the substantially smooth and uniform surface adjacent thereto.

Embodiment 5: The method of any preceding or subsequent embodiment, or combinations thereof, wherein layering the cellulose strips further comprises layering the cellulose strips such that the cellulose strips defining each of the opposed major surfaces have the fibers thereof oriented along a strength axis of the board member.

Embodiment 6: The method of any preceding or subsequent embodiment, or combinations thereof, wherein layering the cellulose strips further comprises layering the cellulose strips such that at least a portion of the cellulose strips not defining either of the opposed major surfaces have the fibers thereof oriented perpendicularly to the strength axis of the board member.

Embodiment 7: The method of any preceding or subsequent embodiment, or combinations thereof, further comprising depositing the layered cellulose strips and the porous sheet member into a mold arrangement prior to exposing the layered cellulose strips and the porous sheet member to the actuating element.

Embodiment 8: The method of any preceding or subsequent embodiment, or combinations thereof, wherein exposing the layered cellulose strips and the porous sheet member to an actuating element further comprises exposing the layered cellulose strips and the porous sheet member to at least one of pressure, heat, humidity, heated air, heated humid air, steam, microwave energy, and infrared energy.

Embodiment 9: The method of any preceding or subsequent embodiment, or combinations thereof, wherein exposing the layered cellulose strips and the porous sheet member to an actuating element further comprises exposing the layered cellulose strips and the porous sheet member to at least one of pressure, heat, humidity, heated air, heated humid air, steam, microwave energy, and infrared energy, in a thermal press, to form the board member.

Embodiment 10: The method of any preceding or subsequent embodiment, or combinations thereof, wherein engaging a porous sheet member with at least one of the major surfaces further comprises engaging a porous sheet member comprising one of a kraft paper, an encasement paper, a cellulose paper, a glass fiber sheet, a glass fiber scrim, a sheet comprising a combination of cellulose fibers and glass fibers, a veneer sheet, a porous sheet in which component fibers thereof treatable with the fire-retarding solution, a paper stock, a card stock, and combinations thereof, with at least one of the major surfaces of the layered cellulose strips.

Embodiment 11: The method of any preceding or subsequent embodiment, or combinations thereof, further comprising interacting the porous sheet member with the fire-retarding solution, the fire-retarding solution comprising one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

Embodiment 12: The method of any preceding or subsequent embodiment, or combinations thereof, further comprising interacting the porous sheet member with the fire-retarding solution, the fire-retarding solution comprising one of an aqueous fire-retarding solution, a nontoxic liquid fire-retarding solution, and a neutral pH liquid fire-retarding solution.

Embodiment 13: The method of any preceding or subsequent embodiment, or combinations thereof, further comprising interacting one of a mold inhibitor, a water resistance treatment, and an insect deterrent with one of the porous sheet member, the fire-retarding solution, the cellulose strips, and the bonding agent prior to exposing the layered cellulose strips and the porous sheet member to the actuating element.

Embodiment 14: An article, comprising a plurality of layers of multi-fiber cellulose strips, the cellulose strips having a bonding agent interacted therewith, and the layered cellulose strips collectively having opposed major surfaces; and a porous sheet member having a fire-retarding solution interacted therewith, and being engaged with at least one of the major surfaces of the layered cellulose strips so as to substantially cover the at least one major surface, the porous sheet member being configured to cooperate with at least one of the layered cellulose strips and the bonding agent, and the cellulose strips, and collectively being responsive to an actuating element configured to facilitate cohesion of the layered cellulose strips and the porous sheet member, such that the at least one major surface having the porous sheet member engaged therewith defines a substantially smooth and uniform surface of a board member formed therefrom.

Embodiment 15: The article of any preceding or subsequent embodiment, or combinations thereof, wherein the bonding agent comprises at least one of urea-formaldehyde (UF), melamine-modified urea-formaldehyde resin (MUF), a phenolic resin, a wax, and methylene diphenyl diisocyanate (MDI).

Embodiment 16: The article of any preceding or subsequent embodiment, or combinations thereof, wherein the layered cellulose strips and the porous sheet member are collectively configured to be responsive to an actuating element configured to actuate a volumetrically-expansive reaction between the fire-retarding solution associated with the porous sheet member and the bonding agent associated with the layered cellulose strips.

Embodiment 17: The article of any preceding or subsequent embodiment, or combinations thereof, wherein the porous sheet member is configured, in conjunction with and in response to the layered cellulose strips and the porous sheet member being exposed to the actuating element, to conform to a substantially smooth and uniform surface adjacent thereto via the volumetrically-expansive reaction.

Embodiment 18: The article of any preceding or subsequent embodiment, or combinations thereof, wherein the cellulose strips are layered such that the cellulose strips defining each of the opposed major surfaces have the fibers thereof oriented along a strength axis of the board member.

Embodiment 19: The article of any preceding or subsequent embodiment, or combinations thereof, wherein the cellulose strips are layered such that at least a portion of the cellulose strips not defining either of the opposed major surfaces have the fibers thereof oriented perpendicularly to the strength axis of the board member.

Embodiment 20: The article of any preceding or subsequent embodiment, or combinations thereof, wherein the bonding agent is configured to be actuated by at least one of pressure, heat, humidity, heated air, heated humid air, steam, microwave energy, and infrared energy.

Embodiment 21: The article of any preceding or subsequent embodiment, or combinations thereof, wherein the porous sheet member comprises one of a kraft paper, an encasement paper, a cellulose paper, a glass fiber sheet, a glass fiber scrim, a sheet comprising a combination of cellulose fibers and glass fibers, a veneer sheet, a porous sheet in which component fibers thereof treatable with the fire-retarding solution, a paper stock, a card stock, and combinations thereof.

Embodiment 22: The article of any preceding or subsequent embodiment, or combinations thereof, wherein the fire-retarding solution comprises one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

Embodiment 23: The article of any preceding or subsequent embodiment, or combinations thereof, wherein the fire-retarding solution comprises one of an aqueous fire-retarding solution, a nontoxic liquid fire-retarding solution, and a neutral pH liquid fire-retarding solution.

Embodiment 24: The article of any preceding or subsequent embodiment, or combinations thereof, further comprising one of a mold inhibitor, a water resistance treatment, and an insect deterrent.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Figure 1:
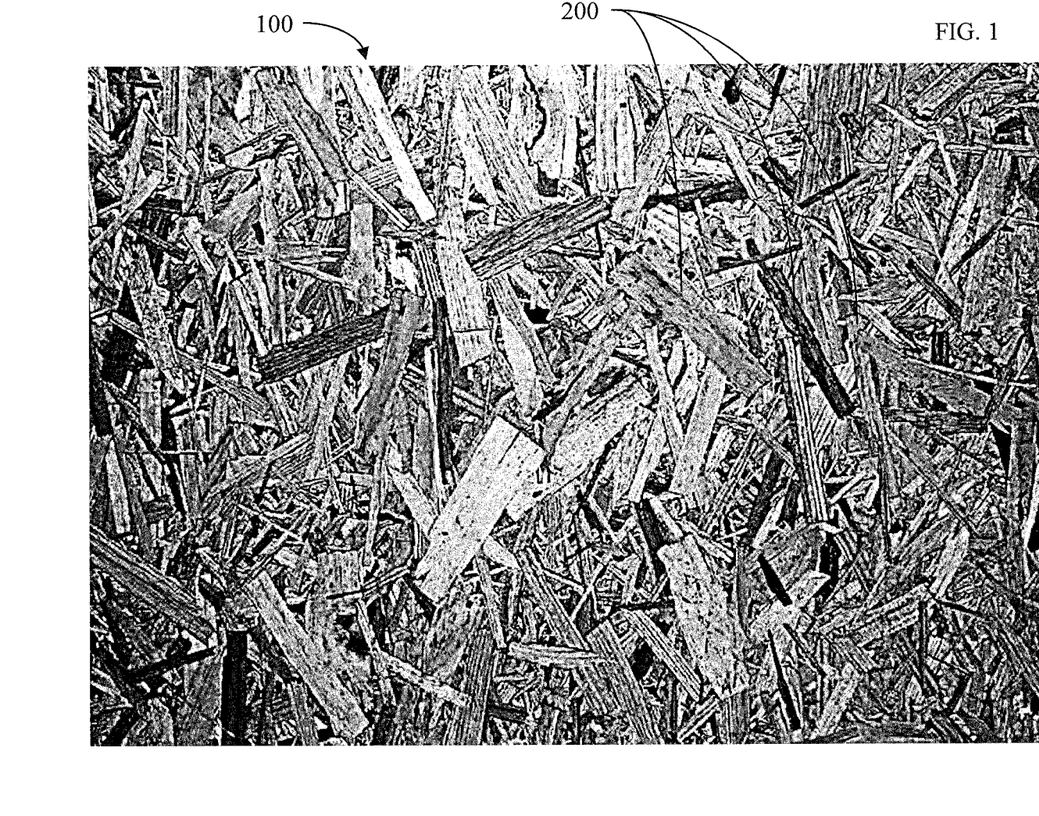
FIG. 1 schematically illustrates an exemplary specimen of an oriented strand board comprised of multi-fiber cellulose strips.

Aspects of the present disclosure are generally directed to a fire resistant sheathed article or product, such as an oriented strand board (OSB), and a production method associated with such an article. As such, one aspect of the present disclosure involves a method of forming an article. In general, as shown in FIG. 1, an oriented strand board 100 is formed by layering multi-fiber cellulose strips 200 in a plurality of layers. Such multi-fiber cellulose strips 200 may vary considerably in actual dimensions and configurations, as will be appreciated by one skilled in the art. Accordingly, such cellulose strips 200 may be considered as, for example, strands, flakes, chips, strips, or other multi-fiber elements, or combinations thereof, from a cellulose (i.e., wood) source. For example, such cellulose strips 200, as implemented herein, may be on the order of up to 1 inch wide by up to 6 inches long and up to 0.25 inches in thickness, in contrast to more refined cellulose fibers or particles which are used, for example, in other cellulose board products, such as MDF or particle board. However, recitation of multi-fiber cellulose strips herein does not necessarily signify that other more refined fibers may be excluded from the subject article. Of course, the article could, in some aspects, comprise exclusively cellulose strips of the type defined herein. In other instances, the article could include some amount of more refined cellulose fibers, in addition to the cellulose strips. In still other instances, other fibers, such as glass fibers, could be used instead of, or in addition to, the refined cellulose fibers. However, in some preferred instances, the article includes a majority (i.e., >50%) of the cellulose strips as defined herein. In yet other instances, one skilled in the art will appreciate that the article disclosed herein is comprised primarily of cellulose including, though not necessarily, up to being comprised exclusively cellulose, but at least comprising a majority of cellulose, and does not include compositions wherein cellulose strips of the type defined herein are added in minor portions to an article primarily comprised of a non-cellulose material. One skilled in the art will also appreciate that, though aspects of the present disclosure are described in relation to an oriented strand board (OSB), that the inventive aspects of the present disclosure may also be similarly applicable to the production of other types of cellulose board articles/products such as, for example, medium density fiber (MDF) board or particle board, and, as such, the scope of the present disclosure is not intended to be limiting in this regard.

Figure 2:
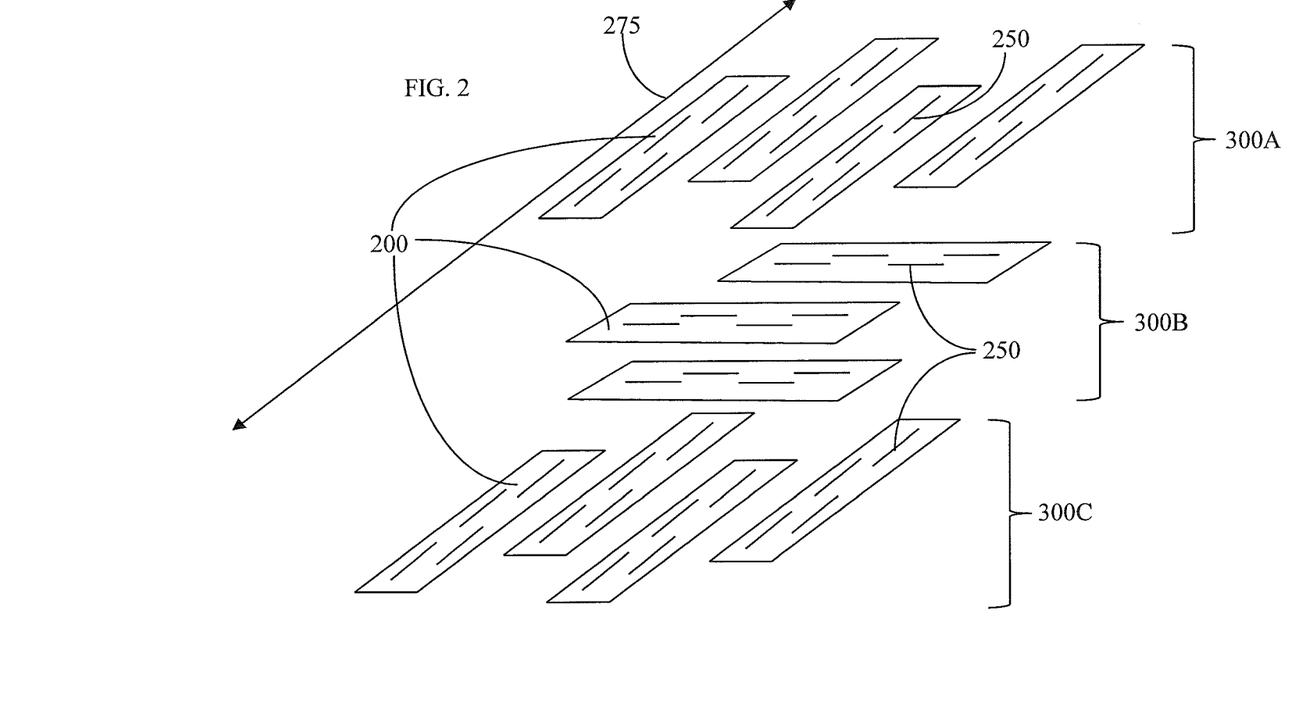
FIG. 2 schematically illustrates adjacent layers of an oriented strand board, wherein the cellulose strips and/or the cellulose fibers thereof in adjacent layers are generally orthogonally arranged with respect to each other.

In order to form a sheet of OSB, the cellulose strips 200 may be layered such that the cellulose strips in the layers defining each of the opposed major surfaces have the fibers 250 thereof oriented generally along a strength axis 275 of the board member 100 (see, e.g., FIG. 2). That is, for example, a sheet of OSB may be provided in a rectangular configuration (i.e., 4 feet by 8 feet), wherein it may be desirable for the OSB sheet to have resistance to flexing along the major dimension (i.e., along the 8 foot long dimension of the surface). In such an instance, the cellulose strips 200 in the surface layers 300A, 300C of that OSB sheet may be oriented so as to generally have the fibers 250 extending along the 8 foot dimension of the OSB sheet, as the strength axis 275 thereof. One skilled in the art will appreciate, however, that the strength axis 275 could also be oriented along the 4 foot long dimension of the OSB sheet, and the fibers 250 of the cellulose strips 200 in the surfaces layers 300A, 300C could be oriented to extend along the 4 foot dimension of the OSB board. Further, in some instances, at least a portion of the cellulose strips 250 not defining either of the opposed major surfaces may have the fibers 250 thereof oriented perpendicularly to the strength axis 275 of the board member. That is, the OSB sheet may include one or more other (medial) layers 300B of cellulose strips 200 between the two surface layers 300A, 300C. Those medial layers 300B may have the cellulose strips 200 oriented such that the fibers 250 thereof are oriented generally perpendicularly to the surface layer. Of course, if the OSB sheet includes a plurality of medial layers, the medial layers may be alternated so as to include a plurality of layers with the fibers of the cellulose strips thereof aligned in parallel with the strength axis, and a plurality of layers with the fibers of the cellulose strips thereof aligned perpendicularly to the strength axis. In some aspects, the overall board member (i.e., OSB) may be configured to have a plurality of layers of cellulose strips, wherein the fibers of cellulose strips in each layer are oriented generally perpendicularly to the fibers of the cellulose strips in the adjacent layer(s) through the thickness of the OSB sheet (see, e.g., FIG. 3A).

In particular aspects of the present disclosure, the layered cellulose strips collectively define opposed major surfaces 150A, 150B (see, e.g., FIG. 3A), with the thickness of the layered cellulose strips comprising the third dimension of the board/article. In forming the board/article, the layered cellulose strips may also include a bonding agent 350 (schematically shown, e.g., in FIG. 3A). The bonding agent 350 may comprise, for example, any one of urea-formaldehyde (UF), melamine-modified urea-formaldehyde resin (MUF), a phenolic resin, a wax, and methylene diphenyl diisocyanate (MDI), or any various combinations thereof. The bonding agent 350 may be added to or otherwise interacted with the layered cellulose strips in various manners. For example, each of the cellulose strips could be coated, treated, or otherwise interacted with the bonding agent prior to forming the layered arrangement. In other instances, in addition to or in the alternative to the treatment of each cellulose strip with the bonding agent, the bonding agent could, for example, be deposited between layers of the cellulose strips as the cellulose strips are being layered.

Figure 3A:
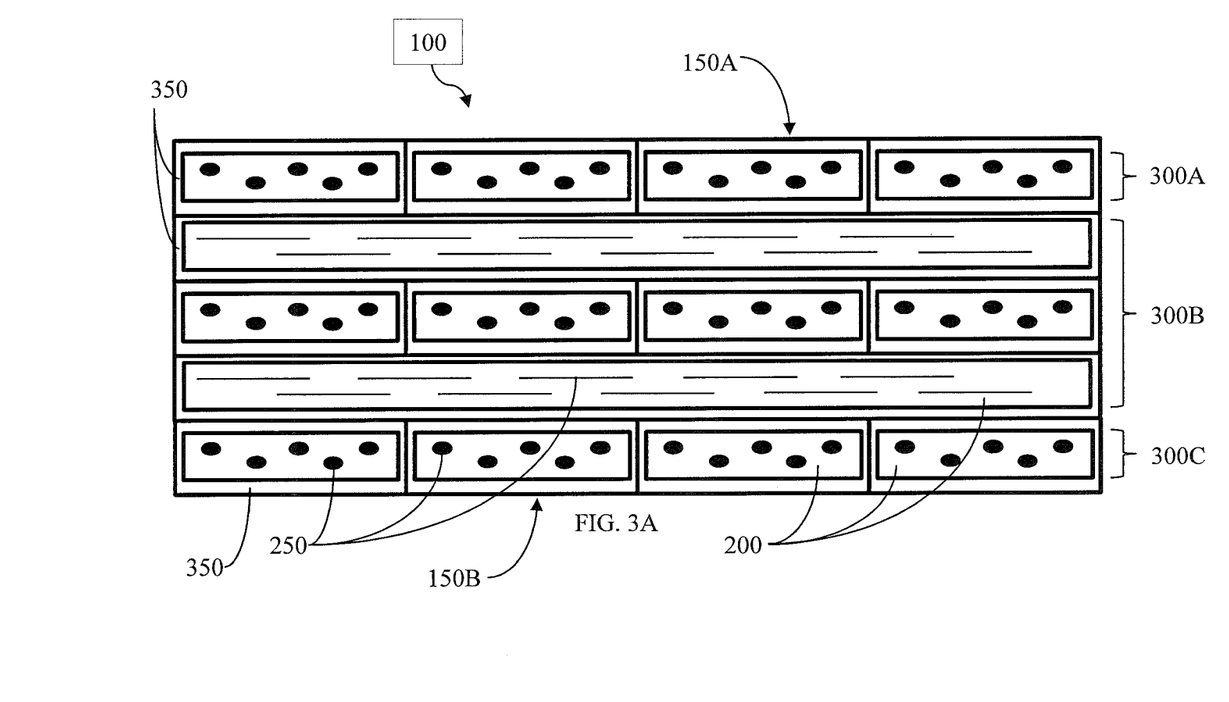
FIG. 3A schematically illustrates adjacent layers of an oriented strand board, wherein the cellulose strips and/or the cellulose fibers thereof in adjacent layers are generally orthogonally arranged with respect to each other, with the cellulose strips being interacted with a bonding agent, according to aspects of the present disclosure.
Figure 3B:
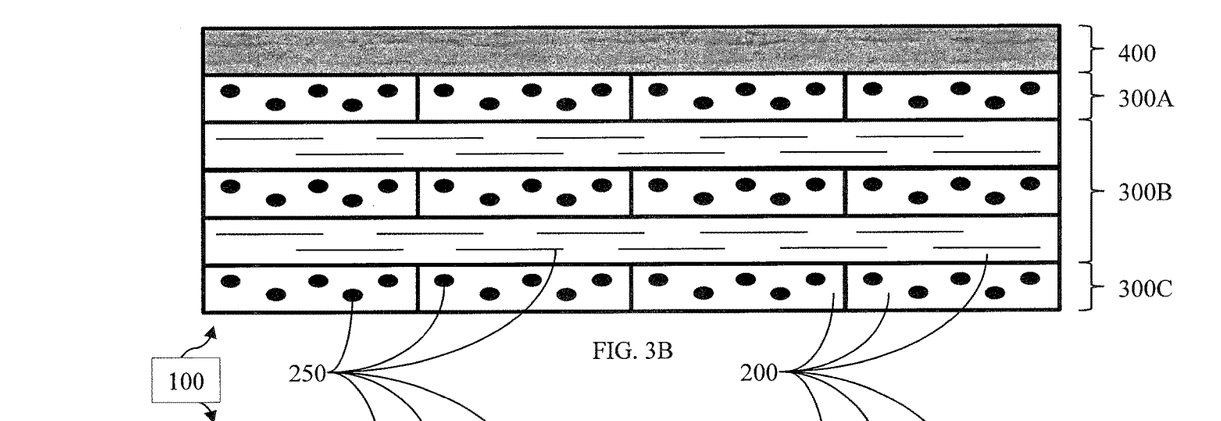
FIGS. 3B and 3C schematically illustrate adjacent layers of an oriented strand board, wherein the cellulose strips and/or the cellulose fibers thereof in adjacent layers are generally orthogonally arranged with respect to each other, with the cellulose strips being interacted with a bonding agent, and at least one of the major surfaces being engaged with a porous sheet member, according to aspects of the present disclosure.
Figure 3C:
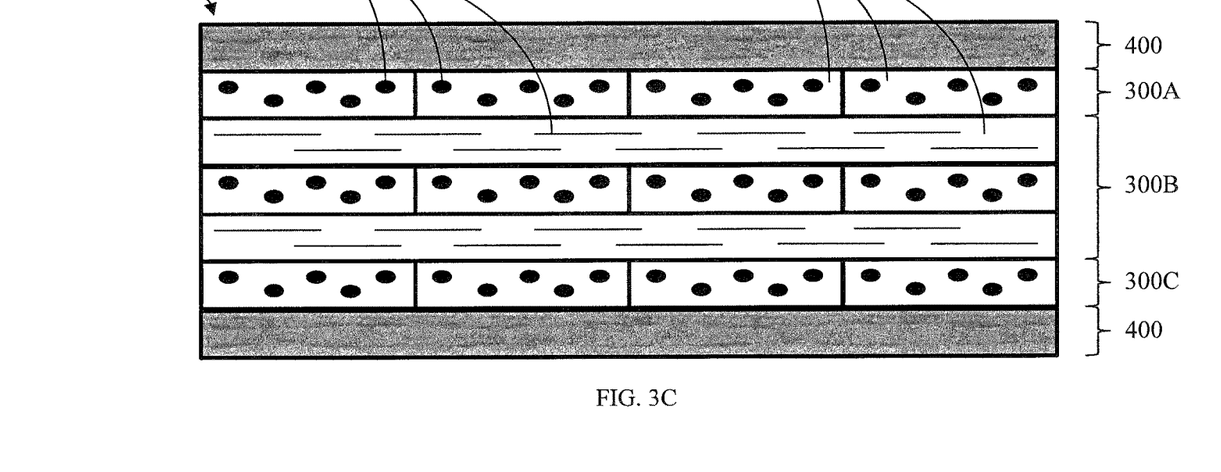
Figure 4A:
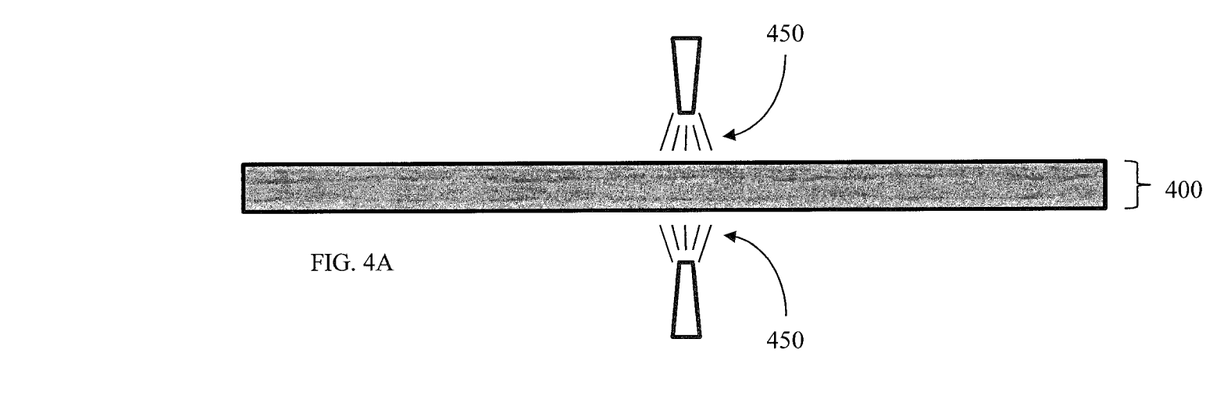
FIGS. 4A and 4B schematically illustrate various arrangements for interacting a porous sheet member with a fire-retarding solution, according to aspects of the present disclosure.
Figure 4B:
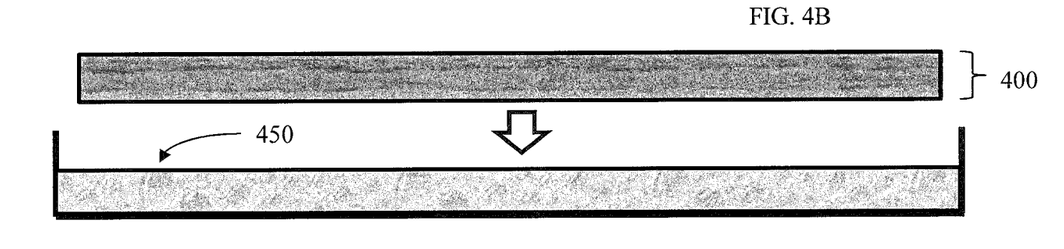

According to particular aspects of the present disclosure, once the cellulose strips 200, interacted with the bonding agent 350, are layered, a porous sheet member 400 may be interacted or otherwise engaged with at least one of the major surfaces 150A, 150B of the layered cellulose strips 200, such that the porous sheet member 400 substantially covers the at least one major surface (see, e.g., FIGS. 3B and 3C, each of which has the bonding agent 350 omitted for the purposes of clarity, though it is expressly understood that such aspects do, in fact, include the bonding agent 350 as previously disclosed and illustrated in FIG. 3A). That is, the porous sheet member 400 may be configured to extend substantially over the exposed lateral area of the layer of cellulose strips 200 defining one of the major surfaces 150A, 150B defined by the collective layers of cellulose strips (i.e., 300A, 300B, 300C). The porous sheet member 400 may comprise, for example, a sheet member comprising a kraft paper, an encasement paper, generally any cellulose or cellulose-based paper, a glass fiber sheet, a glass fiber scrim, a porous sheet comprising any combination of cellulose and glass fibers (i.e., 0% glass fibers up to 100% glass fibers), a veneer sheet, and/or any porous sheet in which component fibers can be treated with the fire-retarding solution, though any relatively thin grade of paper stock or card stock may be sufficient and appropriate in regard to the aspects of the disclosure herein. In particular aspects of the present disclosure, the porous sheet member 400 is treated, engaged, or otherwise interacted with a fire-retarding solution 450 (see, e.g., FIGS. 4A and 4B), prior to the porous sheet member 400 being applied to the at least one major surface of the layered cellulose strips. For example, the fire-retarding solution 450 may be added to and dispersed in the cellulose fiber pulp used to form the porous sheet member. In other instances, the as-formed porous sheet member 400 may be immersed in or otherwise saturated with the fire-retarding solution. For example, the as-formed porous sheet member could be immersed in a container of the fire-retarding solution (see, e.g., FIG. 4B), could be exposed to a shower or other significant volumetric flow of the fire-retarding solution, or could be exposed to a uniform mist or spray of the fire-retarding solution (see, e.g., FIG. 4A) for a period sufficient to thoroughly and uniformly treat the porous sheet member with the fire-retarding solution. In some aspects, if necessary or desired, the multi-fiber cellulose strips may also be treated or otherwise interacted with the fire-retarding solution, in addition to the porous sheet member.

The fire-retarding solution 450 may comprise, for example, one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof. More generally, however, the fire-retarding solution may comprise one of an aqueous fire-retarding solution, a nontoxic liquid fire-retarding solution, and a neutral pH liquid fire-retarding solution. That is, in particular aspects, the fire-retarding solution may be an aqueous fire-retarding solution, or it may be preferred that the fire-retarding solution be nontoxic and/or have a neutral pH and/or be hypoallergenic and/or have any number of otherwise desirable properties or combinations thereof. For example, it may be preferred that the fire-retarding solution be nontoxic and/or have a neutral pH and/or be hypoallergenic and/or have any number of otherwise desirable properties in regard to human/animal and/or environmental safety, while maintaining the necessary efficacy, as implemented and upon exposure to heat and/or flame. In this regard, one skilled in the art will appreciate that various fire-retarding or fire/heat resistant substances, either currently known or later developed or discovered, may be applicable to the disclosed processes and articles herein within the scope of the present disclosure. One skilled in the art will further appreciate that the fire-retarding solution may be formed by adding a solid fire-retardant product to a liquid (i.e., water) or other chemical.

In some aspects, a mold inhibitor, a water resistance treatment, and/or an insect deterrent may be interacted with the porous sheet member and/or the fire-retarding solution, but also may be interacted with the cellulose strips and/or the bonding agent, during arrangement of the layered cellulose strips and the porous sheet member (or, in any event, prior to the formation of the board member therefrom upon exposure to an actuating element). The insect deterrent may comprise, for example, one of glass particles and a borate substance, for providing a termite deterrent.

Once arranged, the layered cellulose strips 200 (including the bonding agent 350) and the porous sheet member 400 are collectively exposed to an actuating element, wherein the actuating element is configured to actuate the bonding agent 350 so as to facilitate cohesion of the layered cellulose strips 200 and the porous sheet member 400, and to form a board member 100 therefrom. That is, the actuating element may preferably be configured to promote actuation of the bonding agent 350, in order for the bonding agent 350 to exhibit the necessary efficacy for facilitating cohesion between the layered cellulose strips 200 and the porous sheet member 400, by way of the bonding agent. The actuating element, in some aspects, facilitates the formation of the layered cellulose strips (including the bonding agent) and the porous sheet member into the board member, wherein, in particular aspects, the at least one major surface having the porous sheet member engaged therewith is substantially smooth and uniform (i.e., the resulting surface of the board product is substantially smooth and uniform by conforming to a substantially smooth and uniform surface adjacent thereto during the response to the actuating element). In particular aspects, an appropriate actuating element may comprise, for example, pressure, heat, humidity, heated air, heated humid air, steam, microwave energy, and/or infrared energy, and/or combinations thereof. In one instance, the layered cellulose strips (including the bonding agent) and the porous sheet member are collectively exposed to an actuating element comprising pressure 600 and heat 650 (see, e.g., FIG. 5). In such instances, the layered cellulose strips (including the bonding agent) and the porous sheet member may be deposited into a mold arrangement 625 prior to being exposed to the actuating element or, in other instances, the layered cellulose strips (including the bonding agent) and the porous sheet member may be, for example, directly deposited in a thermal press (wherein the mold arrangement 625 may comprise an element of the overall thermal press and, thus, both the mold arrangement and thermal press are generally referred to herein by element number 625, wherein the mold arrangement/thermal press 625 may include, for example, a heated-platen press) for exposure to the actuating element. In addition, once actuated by the actuating element to facilitate cohesion between the layered cellulose strips and the porous sheet member, the bonding agent may also promote some desirable characteristics exhibited by the board member such as, for example, a degree of water resistance (i.e., reduced or eliminated "swelling" of the board member if exposed to water).

According to some aspects of the present disclosure, the interaction between the bonding agent associated with the cellulose strips and the fire-retarding solution associated with the porous sheet member, in the presence of sufficient moisture, may cause the formation of a volumetrically-expanding substance, or may otherwise result in volumetric expansion of the mixture. In an unconstrained interaction, such a mixture may result in a volumetrically-expanding foam substance. Once expanded, however, the resulting mixture may undergo a curing or hardening process, whereby the expanded material (mixture) solidifies and hardens.

Accordingly, aspects of the present disclosure achieve the substantially smooth and uniform property of the major surface having the porous sheet member engaged therewith through such interaction. That is, the bonding agent associated with the cellulose strips interacting with the fire-retarding solution associated with the porous sheet member, in the presence of sufficient moisture, for example, from the cellulose strips and/or bonding agent, when constrained by the mold arrangement/thermal press, may result in the formation of the aforementioned volumetrically-expanding substance. The volumetrically-expanding substance may have sufficient reactivity or other properties to cause the volumetrically-expanding substance and/or the porous sheet member to conform to the (usually) smooth and uniform surface of the platen(s) defining the mold arrangement/thermal press, and potentially to fill any voids or non-uniformities between the porous sheet member and the layered cellulose strips. The presence of heat also associated with the mold arrangement/thermal press serves to facilitate the hardening/curing process for the volumetrically-expanding substance so as to fix or set the major surface of the board product (having the porous sheet member engaged therewith), following removal of the board product from the mold arrangement/thermal press.

Figure 5:
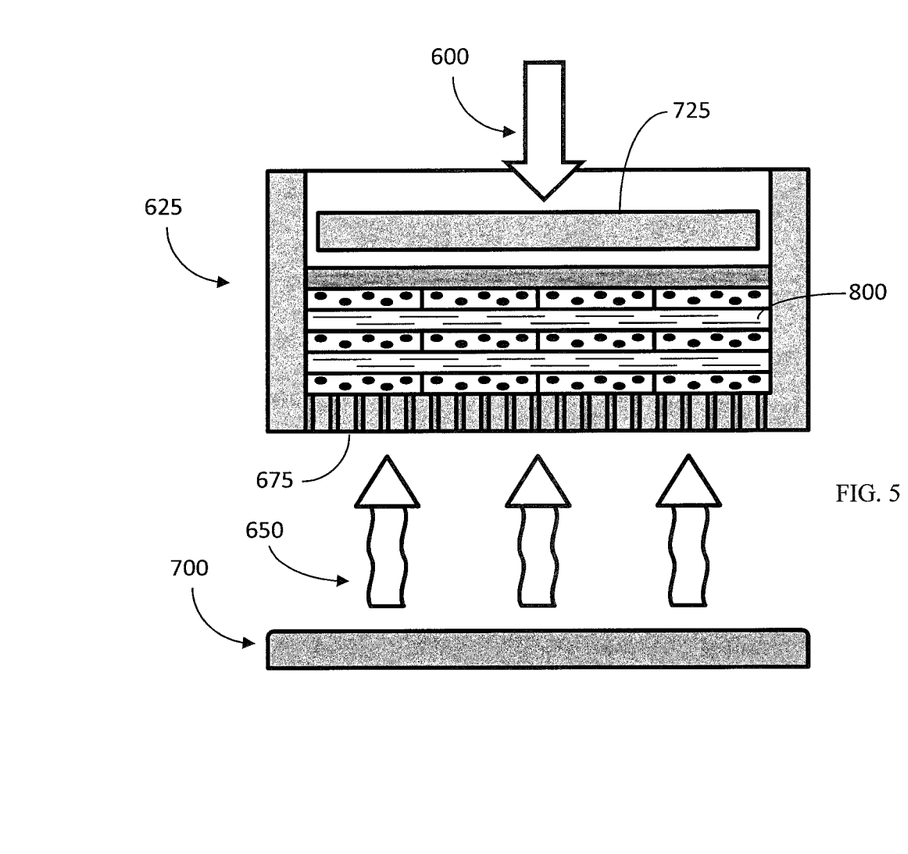
FIG. 5 schematically illustrates adjacent layers of an oriented strand board, wherein the cellulose strips and/or the cellulose fibers thereof in adjacent layers are generally orthogonally arranged with respect to each other, with the cellulose strips being interacted with a bonding agent, and at least one of the major surfaces being engaged with a porous sheet member, wherein the components are received by an exemplary arrangement for exposure to an actuating element, according to aspects of the present disclosure.

Further, in some aspects, the mold arrangement and/or thermal press may be configured to receive the layered cellulose strips, the bonding agent, and the porous sheet member, prior to the layered cellulose strips, the bonding agent, and the porous sheet member being exposed to the actuating element, wherein the mold arrangement/thermal press 625 may be further configured to facilitate exposure of the layered cellulose strips, the bonding agent, and the porous sheet member to the actuating element. For example, where the actuating element comprises heated air, humidity, steam, or heated humid air, the mold arrangement/thermal press 625 may include a porous element 675 having an actuating element source (e.g., element 700 in FIG. 5 representing a source of heat and/or humidity/steam) in communication therewith. Once the layered cellulose strips, the bonding agent, and the porous sheet member (collectively element 800 as shown, for example, in FIG. 5) are deposited in the mold arrangement/thermal press 625, the actuating element from the actuating element source 700 may be directed thereto so as to enter the mold arrangement/thermal press 625 through the porous element 675 so as to interact with the layered cellulose strips, the bonding agent, and the porous sheet member 800 therein. Permeation of the actuating element through the layered cellulose strips, the bonding agent, and the porous sheet member, actuates the bonding agent to facilitate cohesion/adhesion of the cellulose strips in the various layers to form the board member 100. In some aspects, the mold arrangement/thermal press 625 may further include a pressure application aspect (see, e.g., element 725 in FIG. 5, for example, a platen of a heated platen press) for applying pressure to the layered cellulose strips, the bonding agent, and the porous sheet member, while the layered cellulose strips, the bonding agent, and the porous sheet member are exposed to the actuating element. Accordingly, one skilled in the art will appreciate that the density of the board member may vary considerably, as necessary or desired.

Figure 6:
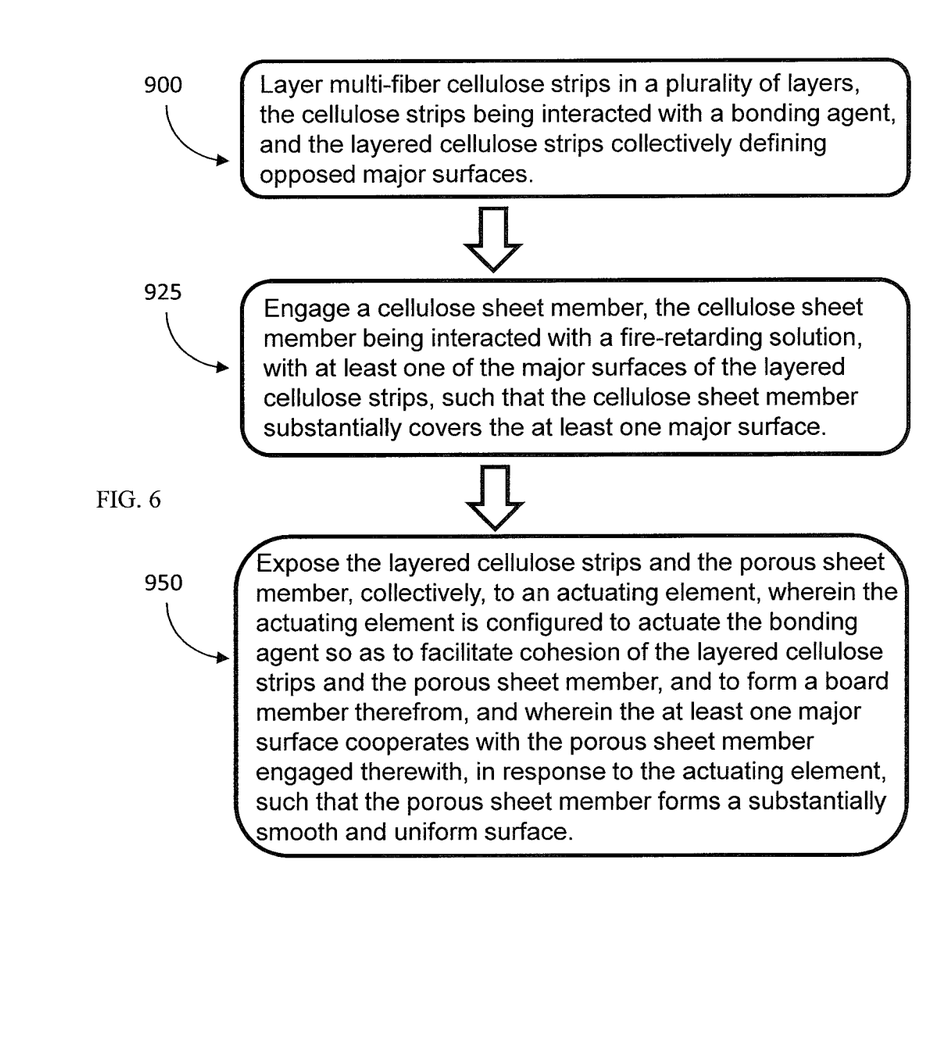
FIG. 6 schematically illustrates a method of forming an article, according to aspects of the present disclosure.

In summary and as shown in FIG. 6, one aspect of the present disclosure may include a method of forming an article. Such a method comprises layering multi-fiber cellulose strips in a plurality of layers, the cellulose strips being interacted with a bonding agent, and the layered cellulose strips collectively defining opposed major surfaces (element 900); engaging a porous sheet member, the porous sheet member being interacted with a fire-retarding solution, with at least one of the major surfaces of the layered cellulose strips, such that the porous sheet member substantially covers the at least one major surface (element 925); and exposing the layered cellulose strips and the porous sheet member, collectively, to an actuating element, wherein the actuating element is configured to actuate the bonding agent so as to facilitate cohesion of the layered cellulose strips and the porous sheet member, and to form a board member therefrom, and wherein the at least one major surface cooperates with the porous sheet member engaged therewith, in response to the actuating element, such that the porous sheet member forms a substantially smooth and uniform surface (element 950).

Another aspect of the present disclosure relates to an article associated with the production method(s) disclosed herein (see, e.g., FIG. 3A-3C), wherein such an article comprises a plurality of layers of multi-fiber cellulose strips, the layered cellulose strips 200 collectively having opposed major surfaces 150A, 150B, and a bonding agent 350 interacted with the cellulose strips 200. A porous sheet member 400 having a fire-retarding solution 450 interacted therewith is engaged with at least one of the major surfaces of the layered cellulose strips so as to substantially cover the at least one major surface. The porous sheet member 400 is configured to cooperate with at least one of the layered cellulose strips 200 and the bonding agent 350 such that the at least one major surface having the porous sheet member engaged therewith defines a substantially smooth and uniform surface of a board member 100 formed therefrom, in response to exposure of the cellulose strips, the bonding agent, and the porous sheet member, collectively, to an actuating element configured to actuate the bonding agent so as to facilitate cohesion of the layered cellulose strips and the porous sheet member to form the board member therefrom. According to such aspects, the porous sheet member 400, when engaged with the layered cellulose strips and upon exposure to the actuation element, may facilitate, contribute to, enhance, or otherwise provide structural properties (i.e., tensile strength, bending resistance, impact resistance, etc.) for the resulting board member 100, particularly if engaged with both major surfaces 150A, 150B thereof. Such structural enhancement may be more apparent in instances of the board member being relatively thin. Further, the porous sheet member 400 may provide a more suitable, substantially smooth and uniform surface for the resulting article/product, for accepting paints, stains, veneers, or other surface treatment for enhancing the aesthetic properties of the end product. One skilled in the art will appreciate, however, that though the sheet member is referred to herein in some aspects as being comprised of a cellulose material, any other suitable material or combination of materials exhibiting the desired properties disclosed herein may also be desirable and capable of being implemented within the scope of the present disclosure, and as otherwise disclosed herein.

Further, in some aspects of the present disclosure, a board product formed in accordance with the disclosed production method(s) may also exhibit other desirable and enhanced properties over those of conventional particles or products (i.e., conventional OSB). For example, such board products may exhibit "zero ignition" and/or "zero flame spread," particularly due to the porous sheet member(s) on the major surface(s) being treated with the fire-retarding solution. In some instances, by treating only the porous sheet member with the fire-retarding solution (which does not preclude the cellulose strips and/or the bonding agent from being treated, combined, or otherwise interacted with the fire-retarding solution), lower cost and production complexity may be realized. In another example, treatment of the porous sheet member with the fire-retarding solution may achieve a more uniform and thorough dispersion and distribution of the fire-retarding solution, such that the resulting fire/heat resistant sheathing provided by the porous sheet product may otherwise enhance the fire resistance (flame spread), as well as thermal barrier (thermal resistance/insulation) characteristics of the resulting board product, which may avoid the need to treat the entire board product with the fire-retarding solution.

Many modifications and other aspects of the disclosures set forth herein will come to mind to one skilled in the art to which these disclosures pertain having the benefit of the teachings presented in the foregoing descriptions and the associated drawings. For example, the general cellulose element concept (i.e., the resulting board member) may be applicable where the general cellulose element is provided as a component or other portion of a further end assembly. Particularly, the general cellulose element as disclosed herein may be, for example, included in a process for manufacturing laminated flooring or cored cabinetry. One skilled in the art will thus appreciate that a board product in accordance with aspects of the present disclosure may be produced such that surface sheathing (porous sheet member) consistently and uniformly incorporates the fire-retarding solution. As such, the components of the end assembly comprising the fire-retardant sheathed board product may likely be wholly resistant to fire and/or unable to ignite on a more permanent basis (i.e., since the fire-retarding solution is effectively integrated into the cellulose product), at least by way of the major surface having the porous sheet member engaged therewith, as compared to simple surface treatments that may be easily removed, washed away, or subject to degradation over time.

In still other aspects, for example, the mold arrangement/thermal press, or any platen or adjacent surface implemented to form the components into the board product may not necessarily have a smooth and uniform surface to which the major surface having the porous sheet member conforms. That is, the platen/adjacent surface may be configured to have a particular texture (i.e., a "textured mold") such as, for example, a wood grain texture or any other desired texture or combinations thereof, wherein the negative of such a texture is formed in the porous sheet member interacted with the major surface. The volumetrically-expansive reaction between the fire-retarding solution associated with the porous sheet member and the bonding agent associated with the layered cellulose strips causes the porous sheet member to be pressed into conformity with the texture of the platen/adjacent surface, thereby imparting a negative of that texture to the porous sheet member upon hardening/curing so as to permanently retain the negative of the texture in the surface of the resulting board or other product or article. In such instances, the underlying cellulose strips or engagements therebetween, voids, or other non-uniformities are still limited or prevented from printing or telegraphing through the surface sheet member. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method of forming an article, said method comprising:
    layering multi-fiber cellulose strips in a plurality of layers, the cellulose strips being interacted with a bonding agent, and the layered cellulose strips collectively defining opposed major surfaces;
    engaging a porous sheet member, the porous sheet member being interacted with a fire-retarding solution, with at least one of the major surfaces of the layered cellulose strips, such that the porous sheet member substantially covers the at least one major surface; and
    exposing the layered cellulose strips and the porous sheet member, collectively, to an actuating element, the actuating element being configured to actuate the bonding agent so as to facilitate cohesion of the layered cellulose strips and the porous sheet member, and to form a board member therefrom, the at least one major surface cooperating with the porous sheet member engaged therewith, in response to the actuating element, such that the porous sheet member forms a substantially smooth and uniform surface;
    wherein exposing the layered cellulose strips and the porous sheet member to an actuating element further comprises exposing the layered cellulose strips and the porous sheet member, collectively, to an actuating element configured to actuate a volumetrically-expansive reaction between the fire-retarding solution associated with the porous sheet member and the bonding agent associated with the layered cellulose strips; and
    further comprising exposing the porous sheet member to a substantially smooth and uniform surface adjacent thereto, in conjunction with exposing the layered cellulose strips and the porous sheet member to the actuating element, such that the volumetrically-expansive reaction causes the porous sheet member to conform to the substantially smooth and uniform surface adjacent thereto.

2. A method according to claim 1, further comprising engaging a bonding agent with the cellulose strips, the bonding agent comprising at least one of urea-formaldehyde (UF), melamine-modified urea-formaldehyde resin (MUF), a phenolic resin, a wax, and methylene diphenyl diisocyanate (MDI).

3. A method according to claim 1, wherein layering the cellulose strips further comprises layering the cellulose strips such that the cellulose strips defining each of the opposed major surfaces have the fibers thereof oriented along a strength axis of the board member.

4. A method according to claim 3, wherein layering the cellulose strips further comprises layering the cellulose strips such that at least a portion of the cellulose strips not defining either of the opposed major surfaces have the fibers thereof oriented perpendicularly to the strength axis of the board member.

5. A method according to claim 1, further comprising depositing the layered cellulose strips and the porous sheet member into a mold arrangement prior to exposing the layered cellulose strips and the porous sheet member to the actuating element.

6. A method according to claim 5, wherein exposing the layered cellulose strips and the porous sheet member to an actuating element further comprises exposing the layered cellulose strips and the porous sheet member to at least one of pressure, heat, humidity, heated air, heated humid air, steam, microwave energy, and infrared energy.

7. A method according to claim 1, wherein exposing the layered cellulose strips and the porous sheet member to an actuating element further comprises exposing the layered cellulose strips and the porous sheet member to at least one of pressure, heat, humidity, heated air, heated humid air, steam, microwave energy, and infrared energy, in a thermal press, to form the board member.

8. A method according to claim 1, wherein engaging a porous sheet member with at least one of the major surfaces further comprises engaging a porous sheet member comprising one of a kraft paper, an encasement paper, a cellulose paper, a glass fiber sheet, a glass fiber scrim, a sheet comprising a combination of cellulose fibers and glass fibers, a veneer sheet, a porous sheet in which component fibers thereof treatable with the fire-retarding solution, a paper stock, a card stock, and combinations thereof, with at least one of the major surfaces of the layered cellulose strips.

9. A method according to claim 1, further comprising interacting the porous sheet member with the fire-retarding solution, the fire-retarding solution comprising one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

10. A method according to claim 1, further comprising interacting the porous sheet member with the fire-retarding solution, the fire-retarding solution comprising one of an aqueous fire-retarding solution, a nontoxic liquid fire-retarding solution, and a neutral pH liquid fire-retarding solution.

11. A method according to claim 1, further comprising interacting one of a mold inhibitor, a water resistance treatment, and an insect deterrent with one of the porous sheet member, the fire-retarding solution, the cellulose strips, and the bonding agent prior to exposing the layered cellulose strips and the porous sheet member to the actuating element.

12. An article, comprising:
    a plurality of layers of multi-fiber cellulose strips, the cellulose strips having a bonding agent interacted therewith, and the layered cellulose strips collectively having opposed major surfaces; and
    a porous sheet member having a fire-retarding solution interacted therewith, and being layered on at least one of the major surfaces of the layered cellulose strips so as to substantially cover the at least one major surface, the bonding agent associated with the layered cellulose strips, on actuation thereof by an actuating element, being reactive in a volumetrically-expansive reaction with the fire-retarding solution associated with the porous sheet member so as to facilitate cohesion between the layered cellulose strips and the porous sheet member, the porous sheet member being adapted to conform to a substantially smooth and uniform surface disposed adjacent thereto, via the volumetrically-expansive reaction between the porous sheet member and the layered cellulose strips, such that the at least one major surface having the porous sheet member engaged therewith defines a substantially smooth and uniform surface of a board member formed therefrom.

13. An article according to claim 12, wherein the bonding agent comprises at least one of urea-formaldehyde (UF), melamine-modified urea-formaldehyde resin (MUF), a phenolic resin, a wax, and methylene diphenyl diisocyanate (MDI).

14. An article according to claim 12, wherein the cellulose strips are layered such that the cellulose strips defining each of the opposed major surfaces have the fibers thereof oriented along a strength axis of the board member.

15. An article according to claim 14, wherein the cellulose strips are layered such that at least a portion of the cellulose strips not defining either of the opposed major surfaces have the fibers thereof oriented perpendicularly to the strength axis of the board member.

16. An article according to claim 12, wherein the actuating element is at least one of pressure, heat, humidity, heated air, heated humid air, steam, microwave energy, and infrared energy.

17. An article according to claim 12, wherein the porous sheet member comprises one of a kraft paper, an encasement paper, a cellulose paper, a glass fiber sheet, a glass fiber scrim, a sheet comprising a combination of cellulose fibers and glass fibers, a veneer sheet, a porous sheet in which component fibers thereof treatable with the fire-retarding solution, a paper stock, a card stock, and combinations thereof.

18. An article according to claim 12, wherein the fire-retarding solution comprises one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

19. An article according to claim 12, wherein the fire-retarding solution comprises one of an aqueous fire-retarding solution, a nontoxic liquid fire-retarding solution, and a neutral pH liquid fire-retarding solution.

20. An article according to claim 12, further comprising one of a mold inhibitor, a water resistance treatment, and an insect deterrent.

* * * * *

UNITED STATES PATENT AND TRADEMARK OFFICE
CERTIFICATE OF CORRECTION

| | | |
|---|---|---|
| PATENT NO. | : 10,569,502 B2 | Page 1 of 1 |
| APPLICATION NO. | : 15/141985 | |
| DATED | : February 25, 2020 | |
| INVENTOR(S) | : Daniel Baroux | |

It is certified that error appears in the above-identified patent and that said Letters Patent is hereby corrected as shown below:

In the Specification

At Column 1, Line 8, the text "No. PCT/US2014/051044, filed October 30, 2014," should be changed to -- No. PCT/CA2014/051044, filed October 30, 2014, --

Signed and Sealed this
Third Day of January, 2023

Katherine Kelly Vidal
*Director of the United States Patent and Trademark Office*